(12) United States Patent
Hanada

(10) Patent No.: US 10,521,103 B2
(45) Date of Patent: Dec. 31, 2019

(54) DISPLAY CONTROL DEVICE AND DISPLAY CONTROL METHOD

(71) Applicant: KYOCERA Document Solutions Inc., Osaka (JP)

(72) Inventor: Naoto Hanada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/033,807

(22) Filed: Jul. 12, 2018

(65) Prior Publication Data

US 2019/0026016 A1   Jan. 24, 2019

(30) Foreign Application Priority Data

Jul. 18, 2017   (JP) ................. 2017-138905

(51) Int. Cl.
- *G06F 3/00* (2006.01)
- *G06F 3/0485* (2013.01)
- *G06F 3/0488* (2013.01)
- *H04N 1/00* (2006.01)
- *G06F 3/0482* (2013.01)

(52) U.S. Cl.
CPC ........ *G06F 3/04855* (2013.01); *G06F 3/0488* (2013.01); *G06F 3/0482* (2013.01); *H04N 1/00411* (2013.01)

(58) Field of Classification Search
CPC .............................. G06F 16/54; G06F 3/0412
USPC ........................................................ 715/786
See application file for complete search history.

(56) References Cited

U.S. PATENT DOCUMENTS

2005/0138066 A1\* 6/2005 Finke-Anlauff ........ G06F 16/54
2017/0357317 A1\* 12/2017 Chaudhri .............. G06F 3/0412

FOREIGN PATENT DOCUMENTS

JP   2013-114338 A   6/2013

\* cited by examiner

*Primary Examiner* — Andrey Belousov
(74) *Attorney, Agent, or Firm* — Studebaker & Brackett PC

(57) ABSTRACT

A display control device includes a touch panel and a controller. The controller includes a display section and a receiving section. The display section displays at least one object on the touch panel. The receiving section receives a slide operation on one of the at least one object. When the slide operation is received by the receiving section, the display section determines based on the slide operation a display range to be displayed on a transition-target screen corresponding to the one object and displays the display range on the touch panel.

6 Claims, 12 Drawing Sheets

| Column | First syllable | Family name | |
|--------|---------------|-------------|---|
| A | A | AIDA, AOYAMA, AKANISI, AKAMATU | ←-- FN, FN1 |
| | | ADATI, AMEMIYA··· | |
| | | ··· | |
| | | ⋮ | |
| | I | | |
| | U | | |
| | E | | |
| | O | | |
| KA | KA | | |
| | KI | | |
| | | ⋮ | |
| | KU | KUKI, KUSIHIRA, KUSIMA, KUDOU | ←-- FN, FN2 |
| | | KURODA, KUROTANI | |
| | KO | KOMON, KOJIMA, KOTANI, KONISI | |
| | | ··· | ←-- FN, FN3 |
| | | ··· | |
| SA | SA | | |

| Column | First syllable | Family name | |
|---|---|---|---|
| A | A | AIDA, AOYAMA, AKANISI, AKAMATU | ← FN, FN1 |
| | | ADATI, AMEMIYA··· | |
| | | ··· | |
| | ⋮ | | |
| | I | | |
| | U | | |
| | E | | |
| | O | | |
| KA | KA | | |
| | KI | | |
| | ⋮ | | |
| | KU | KUKI, KUSIHIRA, KUSIMA, KUDOU | ← FN, FN2 |
| | | KURODA, KUROTANI | |
| | KO | KOMON, KOJIMA, KOTANI, KONISI | |
| | | ··· | ← FN, FN3 |
| | | ··· | |
| SA | SA | | |

FIG. 3

| Movement distance L1 | Region AR | Display method |
|---|---|---|
| 0 ≤ L1 < LA | First region AR1<br>(First syllable is "KA") | Normal |
| LA ≤ L1 < LB | Second region AR2<br>(First syllable is "KI") | Normal |
| LB ≤ L1 < LC | Third region AR3<br>(First syllable is "KU") | Normal |
| LC ≤ L1 < LD | Fourth region AR4<br>(First syllable is "KE") | Normal |
| LD ≤ L1 < LE | Fifth region AR5<br>(First syllable is "KO") | Normal |
| LE ≤ L1 | Fifth region AR5<br>(First syllable is "KO") | Inertial scrolling display |

DISPLAY CONTROL DEVICE AND DISPLAY CONTROL METHOD

INCORPORATION BY REFERENCE

The present application claims priority under 35 U.S.C. § 119 to Japanese Patent Application No. 2017-138905, filed on Jul. 18, 2017. The contents of this application are incorporated herein by reference in their entirety.

BACKGROUND

The present disclosure relates to a display control device and a display control method.

Some display control device includes a mark giving section, a mark determination section, and a scroll display section. When a mark item corresponding to a list item among a plurality of list items included in a list image is touched, the mark giving section gives a mark image to the touched mark item. Upon detection of a flick operation, the mark determination section determines whether or not a mark image is included in the list image. When the mark determination section determines that a mark image is included, the scroll display section scrolls a display range of the list image such that a mark item provided with the mark image is displayed.

SUMMARY

A display control device according to the present disclosure includes a touch panel, a display section, and a receiving section. The display section displays at least one object on the touch panel. The receiving section receives a slide operation on one object of the at least one object. When the slide operation is received by the receiving section, the display section determines based on the slide operation a display range to be displayed on a transition-target screen corresponding to the one object and displays the display range on the touch panel.

A display control method according to the present disclosure is executed by a display control device including a touch panel. The display control method includes displaying, receiving, and determining. In the displaying, at least one object is displayed on the touch panel. In the receiving, a slide operation on one object of the at least one object is received. In the determining, upon reception of the slide operation, a display range to be displayed on a transition-target screen corresponding to the one object is determined based on the slide operation and the display range is displayed on the touch panel.

BRIEF DESCRIPTION OF THE DRAWINGS

FIG. 3 is a diagram illustrating an example of data to be displayed on a transition-target screen.

FIG. 10 is a diagram illustrating an example of a relationship between movement distance and regions.

DETAILED DESCRIPTION

Figure 1:
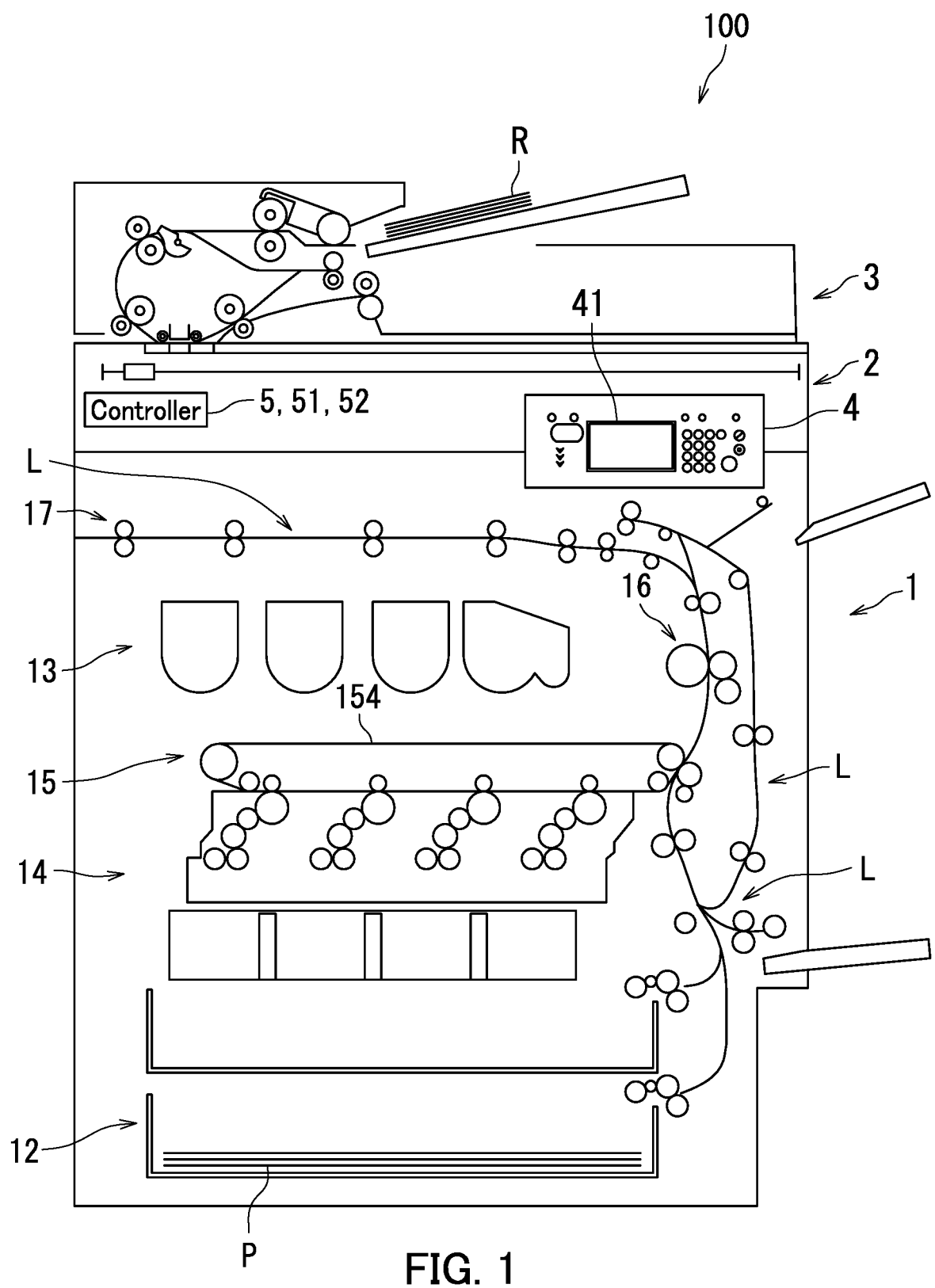
FIG. 1 is a diagram illustrating a configuration of an image forming apparatus according to an embodiment of the present disclosure.

The following describes embodiments of the present disclosure with reference to the accompanying drawings (FIGS. 1 to 12). Note that elements that are the same or equivalent are labelled using the same reference signs in the drawings, and explanation of which is not be repeated.

The following describes a configuration of an image forming apparatus 100 according to an embodiment of the present disclosure with reference to FIG. 1. FIG. 1 is a diagram illustrating the configuration of the image forming apparatus 100. The image forming apparatus 100 is a color multifunction peripheral. The image forming apparatus 100 reads an image formed on an original document R and forms an image on a sheet P of paper with toner.

As illustrated in FIG. 1, the image forming apparatus 100 includes an image forming unit 1, an image reading unit 2, an original document conveyance unit 3, an operation display section 4, and a controller 5. The image forming unit 1 forms an image on a sheet P. The image reading unit 2 reads an image formed on an original document R and generates image information. The original document conveyance unit 3 conveys the original document R to the image reading unit 2. The controller 5 controls operation of the image forming apparatus 100.

The image forming unit 1 includes a feeding section 12, a conveyance section L, a tonner supply section 13, an image forming section 14, a fixing section 16, and an ejection section 17. The image forming section 14 includes a transfer section 15.

The feeding section 12 feeds a sheet P to the conveyance section L. The conveyance section L conveys the sheet P to the ejection section 17 via the transfer section 15 and the fixing section 16.

The tonner supply section 13 supplies toner to the image forming section 14. The image forming section 14 forms an image on the sheet P.

The transfer section 15 includes an intermediate transfer belt 154. The image forming section 14 transfers toner images in cyan, magenta, yellow, and black colors on the intermediate transfer belt 154. The toner images in the respective colors are superimposed on the intermediate transfer belt 154 to form an image on the intermediate transfer belt 154. The transfer section 15 transfers the image formed on the intermediate transfer belt 154 onto the sheet P. Through the above, an image is formed on the sheet P.

The fixing section 16 fixes the image formed on the sheet P to the sheet P by applying heat and pressure to the sheet P. The ejection section 17 ejects the sheet P out of the image forming apparatus 100.

The operation display section 4 receives a user operation. The operation display section 4 includes a touch panel 41. The touch panel 41 includes for example a liquid crystal display (LCD) to display various images. The touch panel 41 also includes a touch sensor to receive a user operation. The touch panel 41 has a rectangular shape. The touch panel 41 and the controller 5 constitute a "display control device".

The controller 5 includes a processor 51 and storage 52. The processor 51 includes for example a central processing unit (CPU). The storage 52 includes memory such as semiconductor memory and may include a hard disk drive (HDD). The storage 52 stores therein a control program.

<First Embodiment>

Figure 2:
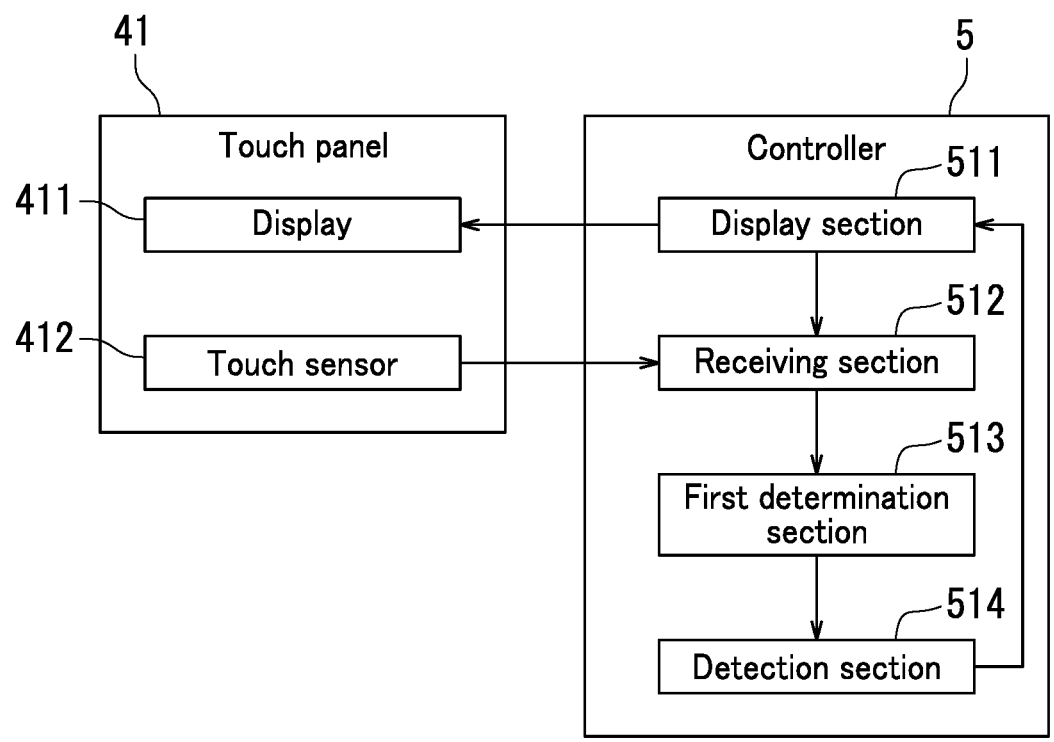
FIG. 2 is a diagram illustrating a configuration of a controller according to a first embodiment.

The following describes a configuration of the controller 5 according to a first embodiment with reference to FIGS. 1 to 4. FIG. 2 is a diagram illustrating the configuration of the controller 5.

As illustrated in FIG. 2, the processor 51 of the controller 5 includes a display section 511, a receiving section 512, a first determination section 513, and a detection section 514. Specifically, the processor 51 functions as the display section 511, the receiving section 512, the first determination section 513, and the detection section 514 through execution of the control program. The display section 511 displays a transition-target screen SC on the touch panel 41.

FIG. 3 is a diagram illustrating an example of data to be displayed on the transition-target screen SC. "Family names" to be used for specifying destinations are displayed on the transition-target screen SC. Each destination indicates for example a destination of facsimile transmission. The first embodiment will be described about a case where the family names are represented in romaji (roman letters) according to the Nihon-shiki romanization system (or the Kunrei-shiki romanization system).

As illustrated in FIG. 3, the family names are stored in the storage 52 of the controller 5 in the order of the Japanese syllabary. In the Japanese syllabary, Japanese kana characters (hiragana or katakana) are arranged in a matrix of five rows according to vowels and ten columns according to consonants. The column titled "Column" in FIG. 3 indicates columns including roman letters that represent the first syllables of the respective family names. Specifically, the column titled "Column" indicates which of the following columns "A" column, "KA" column, "SA" column, "TA" column, "NA" column, "HA" column, "MA" column, "YA" column, "RA" column, and "WA" column includes the roman letters that represent the first syllable of each family name.

Specifically, the "A" column includes roman letters corresponding to five kana characters pronounced with only vowels without consonants. Family names corresponding to the "A" column each have a first syllable represented by any of the above roman letters. The "KA" column includes roman letters corresponding to five kana characters pronounced with a consonant represented by "K". Family names corresponding to the "KA" column each have a first syllable represented by any of the above roman letters. The "SA" column includes roman letters corresponding to five kana characters pronounced with a consonant represented by "S". Family names corresponding to the "SA" column each have a first syllable represented by any of the above roman letters. The "TA" column includes roman letters corresponding to five kana characters pronounced with a consonant represented by "T". Family names corresponding to the "TA" column each have a first syllable represented by any of the above roman letters. The "NA" column includes roman letters corresponding to five kana characters pronounced with a consonant represented by "N". Family names corresponding to the "NA" column each have a first syllable represented by any of the above roman letters. The "HA" column includes roman letters corresponding to five kana characters pronounced with a consonant represented by "H". Family names corresponding to the "HA" column each have a first syllable represented by any of the above roman letters. The "MA" column includes roman letters corresponding to five kana characters pronounced with a consonant represented by "M". Family names corresponding to the "MA" column each have a first syllable represented by any of the above roman letters. The "YA" column includes roman letters corresponding to three kana characters pronounced with a consonant represented by "Y". Family names corresponding to the "YA" column each have a first syllable represented by any of the above roman letters. The "RA" column includes roman letters corresponding to five kana characters pronounced with a consonant represented by "R". Family names corresponding to the "RA" column each have a first syllable represented by any of the above roman letters. The "WA" column includes roman letters corresponding to two kana characters pronounced with a consonant represented by "W". Family names corresponding to the "WA" column each have a first syllable represented by any of the above roman letters.

The column titled "First syllable" in FIG. 3 indicates the first syllables of the respective family names. The column titled "Family name" in FIG. 3 lists groups of family names. Each group includes four family names.

In one example, the first group listed where "Column" is "A" and "First syllable" is "A" includes the following four family names "AIDA", "AOYAMA", "AKANISI", and "AKAMATU". In another example, the first group listed where "Column" is "KA" and "First syllable" is "KO" includes the following four family names "KOMON", "KOJIMA", "KOTANI", and "KONISI".

Three groups are displayed in a display range FN of the transition-target screen SC. The display range FN is for example a display range FN1, a display range FN2, or a display range FN3. The display range FN1 includes for example the first, second, and third groups listed where "Column" is "A" and "First syllable" is "A". The display range FN2 includes for example the last two groups listed where "Column" is "KA" and "First syllable" is "KU" and the first group listed where "Column" is "KA" and "First syllable" is "KO". The display range FN3 includes for example the first, second, and third groups listed where "Column" is "KA" and "First syllable" is "KO".

A destination of facsimile transmission is determined for example by the following procedure. First, a family name is selected from 12 family names (=4 family names×3 groups) displayed in the display range FN of the transition-target screen SC. Upon selection of the family name, a list of all destinations corresponding to that family name is displayed on the touch panel 41. Then, a user selects from the list a destination to which the user intends to transmit a facsimile. Through the above, the destination is determined.

Figure 4:
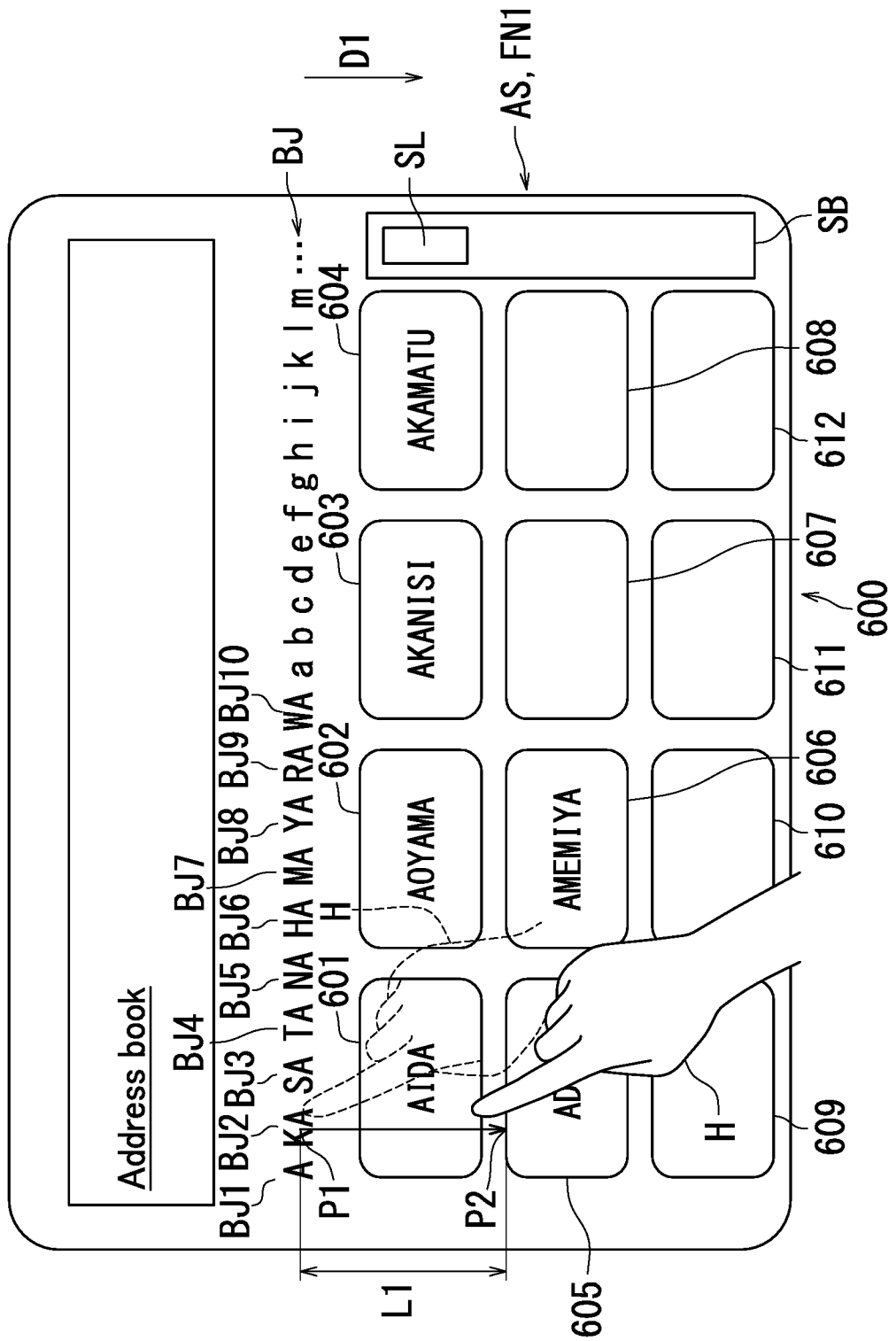
FIG. 4 is a screen diagram illustrating an example of an address selection screen displayed on a touch panel by a display section.

FIG. 4 is a screen diagram illustrating an address selection screen 600 displayed on the touch panel 41 by the display section 511. As illustrated in FIG. 4, objects BJ and an option display area AS are displayed on the address selection screen 600. In the option display area AS of the address selection screen 600, 12 family names are displayed to be used for determining a destination of facsimile transmission by the user.

The objects BJ include a first object BJ1, a second object BJ2, a third object BJ3, a fourth object BJ4, a fifth object BJ5, a sixth object BJ6, a seventh object BJ7, an eighth object BJ8, a ninth object BJ9, and a tenth object BJ10. The first through tenth objects BJ1 to BJ10 correspond to the "A" through "WA" columns, respectively.

The user performs an operation on one object BJ of the objects BJ in order to change the display range FN displayed in the option display area AS. In one example, when the user touches the second object BJ2, 12 family names included in the first through third groups listed where "Column" is "KA" and "First syllable" is "KA" (see FIG. 3) are displayed. In another example, when the user touches the fourth object BJ4, 12 family names included in the first through third groups listed where "Column" is "TA" and "First syllable" is "TA" (see FIG. 3) are displayed.

In the option display area AS, 12 family names are displayed so as to be selectable. For example, 12 family names included in the display range FN1 are displayed in the option display area AS. Specifically, 12 buttons (buttons 601, 602, 603, 604, 605, 606, 607, 608, 609, 610, 611, and 612) corresponding to the 12 family names are displayed in the option display area AS. The 12 family names are each displayed on a corresponding one of the buttons 601 to 612.

For example, "AIDA" is displayed on the button 601, "AOYAMA" is displayed on the button 602, "AKANISI" is displayed on the button 603, and "AKAMATU" is displayed on the button 604. That is, the family names included in the first group listed where "Column" is "A" and "First syllable" is "A" (see FIG. 3) are displayed on the buttons 601 to 604.

A scroll bar SB is also displayed in the option display area AS. The scroll bar SB is operated by the user in order to scroll the 12 buttons displayed in the option display area AS. The scroll bar SB includes a slider SL. The user scrolls the 12 buttons displayed in the option display area AS by dragging the slider SL in a lengthwise direction of the scroll bar SB (i.e., up-down direction).

The following specifically describes the configuration of the controller 5 with reference to FIGS. 2 and 4.

The display section 511 displays at least one object BJ on the touch panel 41.

The receiving section 512 receives a slide operation TS on one object BJ of the at least one object BJ.

The first determination section 513 determines whether or not an operation duration PD of the slide operation TS is lasting. The operation duration PD is a period from the start of the slide operation TS to the end thereof.

The detection section 514 detects a movement distance LM from a start point PS of the slide operation TS. The movement distance LM is a distance from the start point PS of the slide operation TS to a touch point PT. The touch point PT is a point located on the touch panel 41 and touched by the user.

When the slide operation TS is received by the receiving section 512, the display section 511 determines a display range FN to be displayed on a transition-target screen SC based on the slide operation TS and displays the display range FN on the touch panel 41. The transition-target screen SC is a screen corresponding to the one object BJ on which the slide operation TS is performed.

As described above with reference to FIGS. 1 to 4, in the first embodiment of the present disclosure, a display range FN to be displayed on a transition-target screen SC corresponding to an object BJ is determined based on a slide operation TS on the object BJ, and the display range FN is displayed on the touch panel 41. Therefore, selection of the transition-target screen SC and selection of the display range FN can be done by a single slide operation TS. The above results in improvement in operability of the touch panel 41.

The following further describes processing performed by the controller 5 with reference to FIGS. 2 to 5. An example of the slide operation TS performed by the user will be described with reference to FIG. 4. The slide operation TS illustrated in FIG. 4 is performed as follows. First, the user touches a start point P1 in the second object BJ2 with the forefinger of the user's hand H. Then, the user moves the forefinger to an end point P2 while keeping the forefinger touching the touch panel 41. Then at the end point P2, the user removes the forefinger from the touch panel 41.

In the slide operation TS, the forefinger is moved in a movement direction parallel to a direction D1 (i.e., downward direction). The direction D1 is parallel to a direction of extension of short sides of the touch panel 41. A movement distance L1 from the start point P1 of the slide operation TS indicates a distance from the start point P1 to the end point P2.

Figure 5:
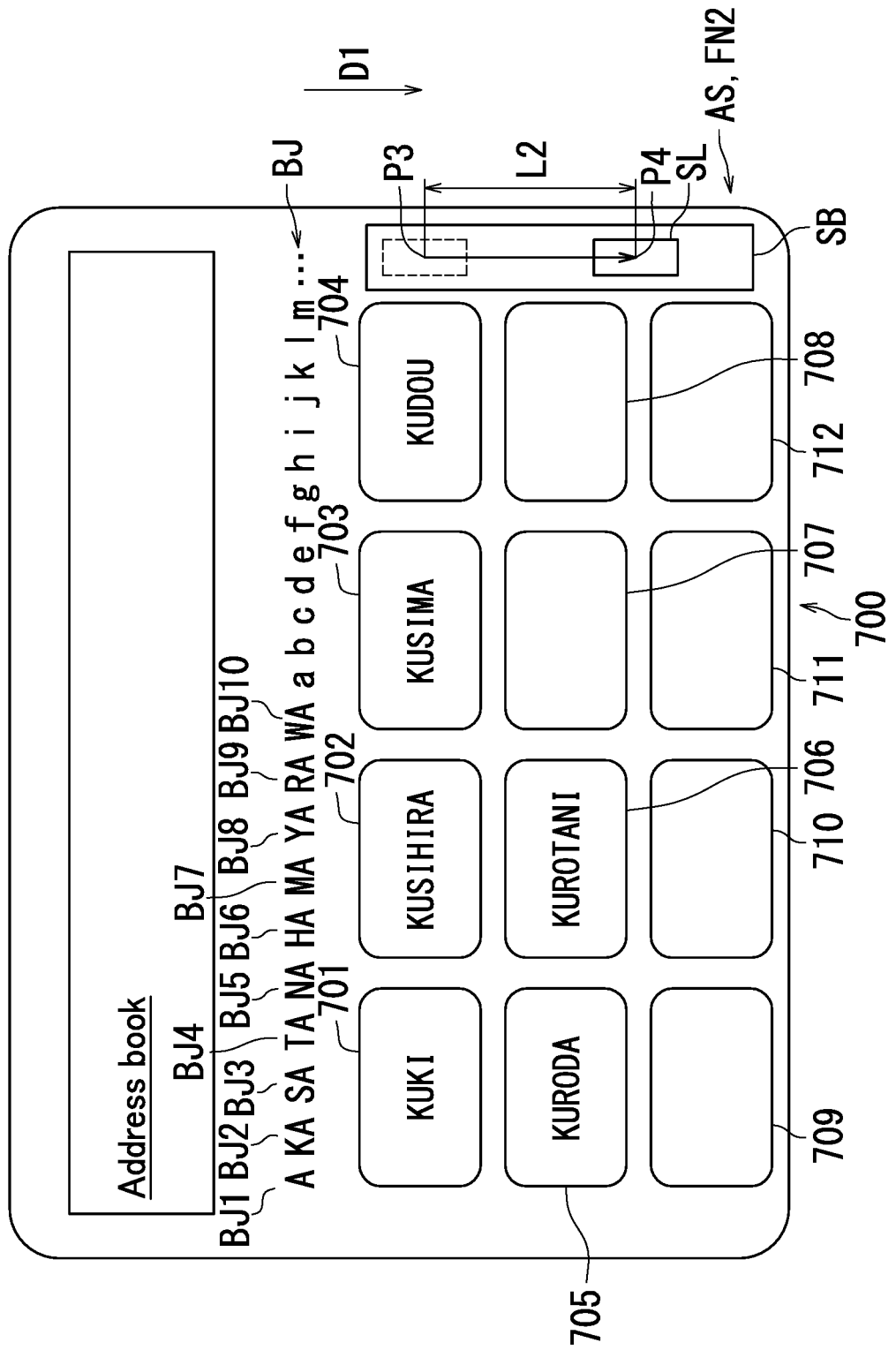
FIG. 5 is a screen diagram illustrating an example of an address selection screen displayed after a slide operation.

In response to the slide operation TS, the display section 511 displays an address selection screen 700 illustrated in FIG. 5 on the touch panel 41. FIG. 5 is a screen diagram illustrating an example of the address selection screen 700 displayed after the slide operation TS. As illustrated in FIG. 5, objects BJ and an option display area AS are displayed on the address selection screen 700.

The objects BJ include the first through tenth objects BJ1 to BJ10.

In the option display area AS, 12 family names included in the display range FN2 are displayed. Specifically, 12 buttons (buttons 701, 702, 703, 704, 705, 706, 707, 708, 709, 710, 711, and 712) corresponding to the 12 family names are displayed in the option display area AS. The 12 family names are each displayed on a corresponding one of the buttons 701 to 712.

For example, "KUKI" is displayed on the button 701, "KUSIHIRA" is displayed on the button 702, "KUSIMA" is displayed on the button 703, and "KUDOU" is displayed on the button 704. That is, family names included in a group listed the second from the last where "Column" is "KA" and "First syllable" is "KU" (see FIG. 3) are displayed on the buttons 701 to 704.

A scroll bar SB is also displayed in the option display area AS. The scroll bar SB includes a slider SL. A center of the slider SL is located at a point P4. The point P4 is located at a distance L2 from a point P3 in the direction D1. The point P3 indicates an upper limit of a range across which the slider SL is movable within the scroll bar SB. The distance L2 is the same as the movement distance L1.

The following describes processing performed by the controller 5 of the first embodiment to display the address selection screen 700 illustrated in FIG. 5 on the touch panel 41 when the slide operation TS is performed on the address selection screen 600 illustrated in FIG. 4.

The detection section 514 detects the movement distance L1. The display section 511 determines, based on the slide operation TS, the display range FN2 to be displayed on a transition-target screen SC (address selection screen 700) and displays the display range FN2 on the touch panel 41. Specifically, the transition-target screen SC includes the scroll bar SB. The display range FN2 corresponds to a display range FN to be displayed in a situation in which a slide operation TS is performed on the slider SL of the scroll bar SB.

The display section 511 determines the display range FN2 as follows. That is, the display section 511 determines as the display range FN2 a display range FN to be displayed in a situation in which the second object BJ2 is touched and the slider SL of the scroll bar SB is then dragged in the direction D1 by the movement distance L1.

As described above with reference to FIGS. 2 to 5, in the first embodiment of the present disclosure, the display section 511 displays on the touch panel 41 the display range FN2 corresponding to a display range FN to be displayed in a situation in which a slide operation TS is performed on the slider SL of the scroll bar SB on the transition-target screen SC. In the above configuration, the user can perform a slide operation TS on an object BJ in a manner as if the user performs the slide operation TS on the slider SL of the scroll bar SB on the transition-target screen SC. The above results in further improvement in operability of the touch panel 41.

Figure 6:
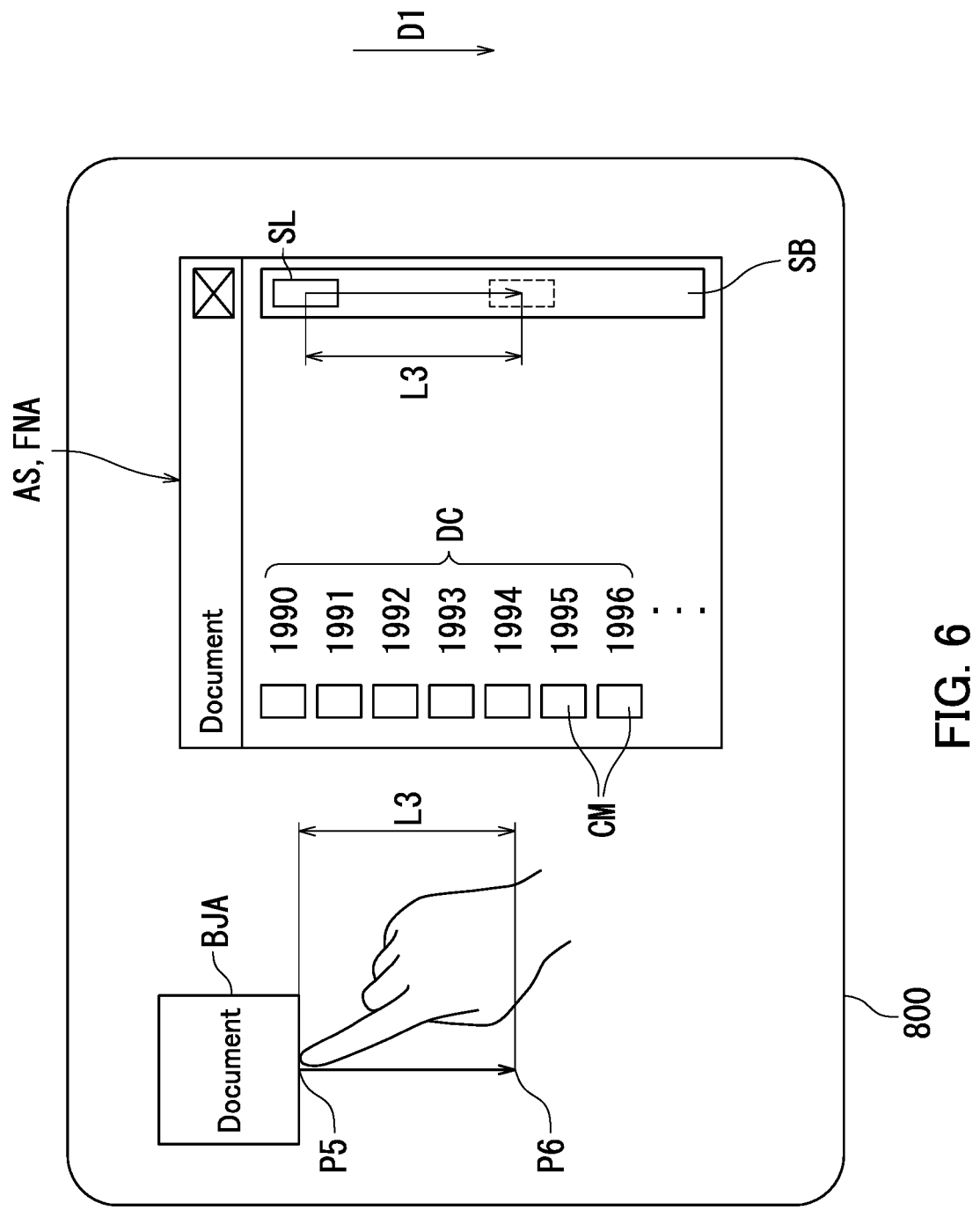
FIG. 6 is a screen diagram illustrating an example of a document selection screen on which a slide operation is performed.

The following further describes processing performed by the controller 5 according to the first embodiment of the present disclosure with reference to FIGS. 2 and 6. FIG. 6 is a screen diagram illustrating an example of a document selection screen 800 on which a slide operation TS is performed. The document selection screen 800 differs from the address selection screens 600 and 700 illustrated in FIGS. 4 and 5 that display family names so as to be selectable in that the document selection screen 800 displays documents so as to be selectable.

As illustrated in FIG. 6, an object BJA and an option display area AS are displayed on the document selection screen 800. The user performs a slide operation TS on the object BJA in order to select a document.

The slide operation TS is performed as follows. First, the user touches a start point P5 in the object BJA with the forefinger of the hand H. Then, the user moves the forefinger to an end point P6 while keeping the forefinger touching the touch panel 41. Then at the end point P6, the user removes the forefinger from the touch panel 41. In the slide operation TS, the forefinger is moved in a movement direction parallel to the direction D1 (i.e., downward direction). A movement distance L3 of the slide operation TS indicates a distance from the start point P5 to the end point P6.

A document display area DC and a scroll bar SB are displayed in the option display area AS. Check boxes CM corresponding to documents grouped on an year-by-year basis are displayed in the document display area DC so as to be selectable. For example, check boxes CM each corresponding to one of documents in 1990, 1991, 1992, 1993, 1994, 1995, and 1996 are displayed in the document display area DC so as to be selectable.

When a check box CM is touched by the user, a list of corresponding documents is displayed. For example, the user touches a check box CM of "1993" in order to display a list of documents in 1993.

The scroll bar SB includes a slider SL. The user scrolls the document display area DC displayed in the option display area AS by dragging the slider SL in a lengthwise direction of the scroll bar SB (i.e., up-down direction).

The controller 5 performs the following processing in response to the slide operation TS. The detection section 514 detects the movement distance L3. The display section 511 determines, based on the slide operation TS, a display range FNA to be displayed on a transition-target screen SC (document selection screen 800) and displays the display range FNA on the touch panel 41. The transition-target screen SC includes the scroll bar SB. The display range FNA corresponds to a display range FN to be displayed in a situation in which a slide operation TS is performed on the slider SL of the scroll bar SB.

The display section 511 determines the display range FNA as follows. That is, the display section 511 determines as the display range FNA a display range FN to be displayed in a situation in which the object BJA is touched and the slider SL of the scroll bar SB is then dragged in the direction D1 by the movement distance L3.

As described above with reference to FIGS. 2 and 6, in the first embodiment of the present disclosure, the user can perform a slide operation TS on the object BJA in a manner as if the user performs the slide operation TS on the slider SL of the scroll bar SB on the transition-target screen SC. Therefore, the user can easily cause display of a list of documents in a desired year. The above results in improvement in operability of the touch panel 41.

Figure 7:
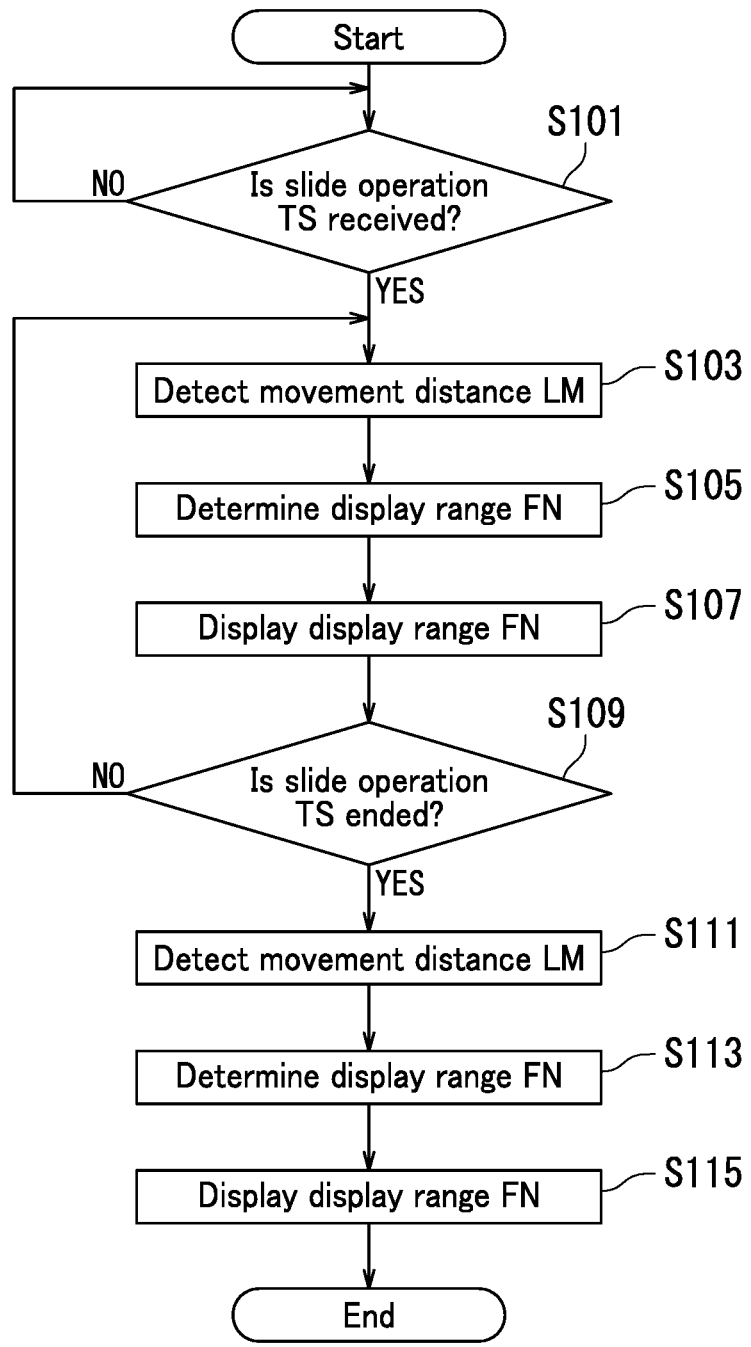
FIG. 7 is a flowchart depicting an example of processing performed by the controller according to the first embodiment.

The following describes processing performed by the controller 5 according to the first embodiment with reference to FIGS. 2 to 7. FIG. 7 is a flowchart depicting an example of the processing performed by the controller 5 according to the first embodiment. Note that the controller 5 performs the following processing in a situation in which an object BJ is displayed on the touch panel 41 by the display section 511.

First, the receiving section 512 determines at Step S101 whether or not a slide operation TS on the object BJ is received.

When the receiving section 512 determines that no slide operation TS is received (NO at Step S101), the processing is suspended. When the receiving section 512 determines that the slide operation TS is received (YES at Step S101), the routine proceeds to Step S103.

At Step S103, the detection section 514 detects a movement distance LM of the slide operation TS.

At Step S105, the display section 511 determines a display range FN corresponding to the movement distance LM.

At Step S107, the display section 511 displays the display range FN on the touch panel 41.

At Step S109, the first determination section 513 determines whether or not an operation duration PD is lasting. Specifically, the first determination section 513 determines whether or not the slide operation TS is ended.

When the first determination section 513 determines that the slide operation TS is not ended (NO at Step S109), the routine returns to Step S103. When the first determination section 513 determines that the slide operation TS is ended (YES at Step S109), the routine proceeds to Step S111.

At Step S111, the detection section 514 detects a movement distance LM of the slide operation TS.

At Step S113, the display section 511 determines a display range FN corresponding to the movement distance LM.

At Step S115, the display section 511 displays the display range FN on the touch panel 41 and the processing ends then.

Note that Step S101 corresponds to an example of "receiving". Steps S105 and S113 correspond to an example of "determining".

As described above with reference to FIGS. 2 to 7, in the first embodiment of the present disclosure, when the first determination section 513 determines that the operation duration PD of the slide operation TS is lasting, the display section 511 determines a display range FN corresponding to a movement distance LM and displays the display range FN on the touch panel 41. Therefore, the user can cause display of a desired display range FN on the touch panel 41. Specifically, the user can cause display of a desired display range FN on the touch panel 41 by ending the slide operation TS when the desired display range FN is displayed on the touch panel 41. The user can end the slide operation TS by removing the forefinger from the touch panel 41. The above results in further improvement in operability of the touch panel 41.

<Second Embodiment>

Figure 8:
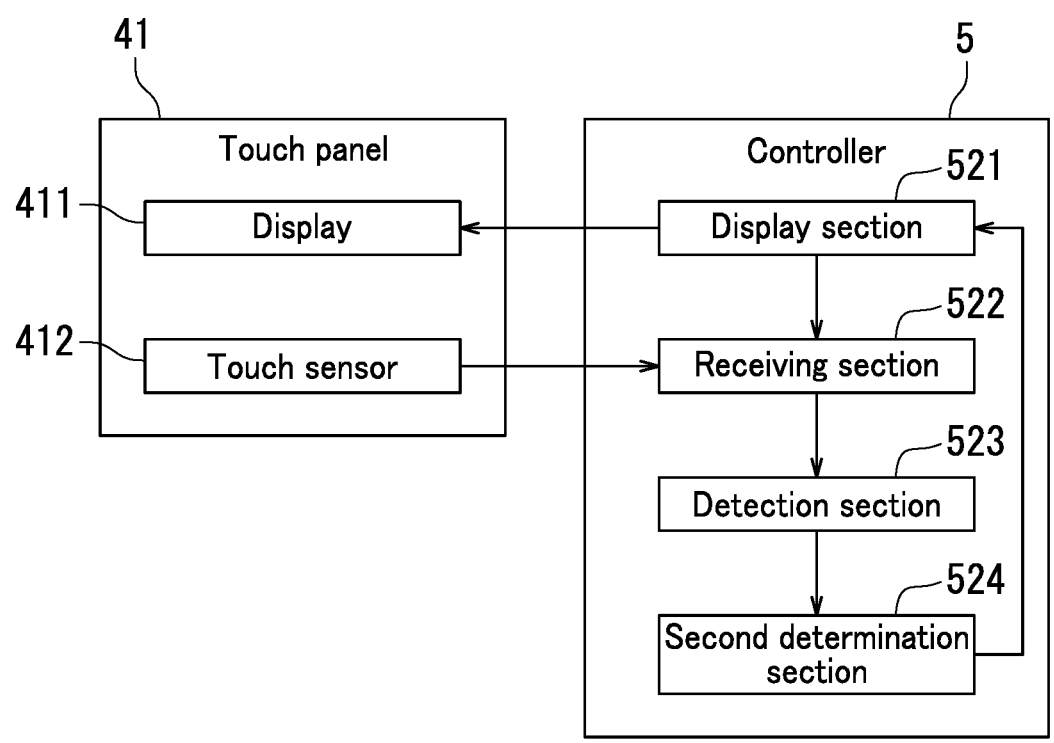
FIG. 8 is a diagram illustrating a configuration of a controller according to a second embodiment.
Figure 9:
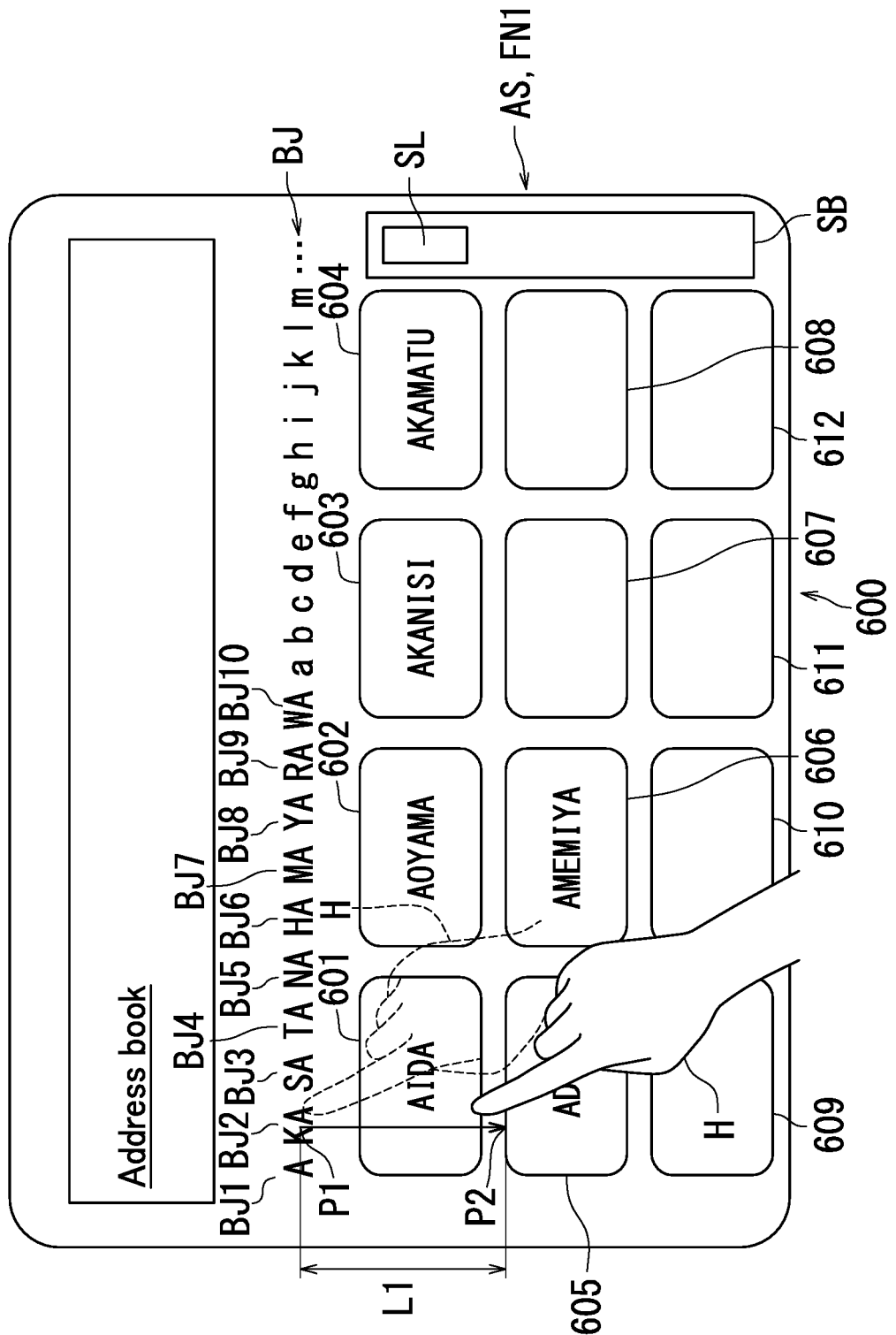
FIG. 9 is a screen diagram illustrating an example of an address selection screen displayed on the touch panel by the display section.

The following describes a configuration of a controller 5 according to a second embodiment with reference to FIGS. 8 and 9. FIG. 8 is a diagram illustrating the configuration of the controller 5 according to the second embodiment. The controller 5 according to the second embodiment differs from the controller 5 according to the first embodiment in inclusion of a second determination section 524 in place of the first determination section 513. Specifically, the first determination section 513 determines whether or not the operation duration PD is lasting, whereas the second determination section 524 determines whether or not a movement distance LM is at least a predetermined distance LP. The following mainly describes difference from the controller 5 according to the first embodiment.

As illustrated in FIG. 8, a processor 51 of the controller 5 includes a display section 521, a receiving section 522, a detection section 523, and the second determination section 524. Specifically, the processor 51 functions as the display section 521, the receiving section 522, the detection section 523, and the second determination section 524 through execution of the control program. The display section 521 displays a transition-target screen SC on the touch panel 41.

FIG. 9 is a screen diagram illustrating an address selection screen 600 displayed on the touch panel 41 by the display section 521. The address selection screen 600 illustrated in FIG. 9 is the same as that illustrated in FIG. 4. Therefore, only important elements of the address selection screen 600 will be described and detailed explanation will be omitted.

As illustrated in FIG. 9, objects BJ and an option display area AS are displayed on the address selection screen 600. The objects BJ include first through tenth objects BJ1 to BJ10. The first through tenth objects BJ1 to BJ10 correspond to the "A" to "WA" columns, respectively.

In the option display area AS, 12 buttons 601 to 612 are displayed. The 12 buttons 601 to 612 correspond to 12 family names. A scroll bar SB is also displayed in the option display area AS. The scroll bar SB includes a slider SL. A slide operation TS is performed for example on the second object BJ2. A movement distance L1 indicates a movement distance LM of the slide operation TS.

The following specifically describes the configuration of the controller 5 with reference to FIGS. 8 and 9.

The display section 521 displays at least one object BJ on the touch panel 41. The receiving section 522 receives a slide operation TS on one object BJ of the at least one object BJ.

The detection section 523 detects a movement distance LM from a start point PS of the slide operation TS.

When the slide operation TS is ended, the second determination section 524 determines whether or not the movement distance LM is at least a predetermined distance LP.

When the slide operation TS is received by the receiving section 522, the display section 521 determines, based on the slide operation TS, a display range FN to be displayed on a transition-target screen SC corresponding to the one object BJ on which the slide operation TS is performed and displays the display range FN on the touch panel 41.

Further, when the second determination section 524 determines that the movement distance LM is at least the predetermined distance LP, the display section 521 causes inertial scrolling display of the transition-target screen SC. In inertial scrolling display, the transition-target screen SC is displayed while being scrolled as if inertia is acting thereon even after the slide operation TS is ended.

As described above with reference to FIGS. 8 and 9, in the second embodiment of the present disclosure, inertial scrolling display of the transition-target screen SC is caused when the movement distance LM is at least the predetermined distance LP. Therefore, the user can check if a desired display range is displayed during inertial scrolling display of the transition-target screen SC. The above results in further improvement in operability of the touch panel 41.

The following further describes processing performed by the controller 5 according to the second embodiment with reference to FIGS. 8 to 10. FIG. 10 is a diagram illustrating an example of a relationship between the movement distance L1 and regions AR. The transition-target screen SC is sectioned into a plurality of regions AR. Family names are displayed on the transition-target screen SC. Each family name displayed on the transition-target screen SC has a first syllable represented by roman letters included in the "KA" column. The display section 521 determines a region among the plurality of regions AR as a display range FN based on the movement distance L1.

Specifically, as shown in the column titled "Region AR" in FIG. 10, the transition-target screen SC is sectioned into a first region AR1, a second region AR2, a third region AR3, a fourth region AR4, and a fifth region AR5. The first region AR1 of the transition-target screen SC includes family names each having a first syllable represented by roman letters included in an "A" row. The "A" row includes roman letters corresponding to 10 kana characters pronounced with a vowel represented by "A". The first syllable of each family name included in the first region AR1 is represented by any of the above roman letters. Specifically, each family name displayed on the transition-target screen SC has a first syllable represented by roman letters included in the "KA" column. Accordingly, the first region AR1 of the transition-target screen SC includes family names each having a first syllable represented by "KA".

The second region AR2 of the transition-target screen SC includes family names each having a first syllable represented by roman letters included in an "I" row. The "I" row includes roman letters corresponding to 8 kana characters pronounced with a vowel represented by "I". The first syllable of each family name included in the second region AR2 is represented by any of the above roman letters. Specifically, each family name displayed on the transition-target screen SC has a first syllable represented by roman letters included in the "KA" column. Accordingly, the second region AR2 of the transition-target screen SC includes family names each having a first syllable represented by "KI". The third region AR3 of the transition-target screen SC includes family names each having a first syllable represented by roman letters included in an "U" row. The "U" row includes roman letters corresponding to 9 kana characters pronounced with a vowel represented by "U". The first syllable of each family name included in the third region AR3 is represented by any of the above roman letters. Specifically, each family name displayed on the transition-target screen SC has a first syllable represented by roman letters included in the "KA" column. Accordingly, the third region AR3 of the transition-target screen SC includes family names each having a first syllable represented by "KU".

The fourth region AR4 of the transition-target screen SC includes family names each having a first syllable represented by roman letters included in an "E" row. The "E" row includes roman letters corresponding to 8 kana characters pronounced with a vowel represented by "E". The first syllable of each family name included in the fourth region AR4 is represented by any of the above roman letters. Specifically, each family name displayed on the transition-target screen SC has a first syllable represented by roman letters included in the "KA" column. Accordingly, the fourth region AR4 of the transition-target screen SC includes family names each having a first syllable represented by "KE". The fifth region AR5 of the transition-target screen SC includes family names each having a first syllable represented by roman letters included in an "O" row. The "O" row includes roman letters corresponding to 10 kana characters pronounced with a vowel represented by "O". The first syllable of each family name included in the fifth region AR5 is represented by any of the above roman letters. Specifically, each family name displayed on the transition-target screen SC has a first syllable represented by roman letters included in the "KA" column. Accordingly, the fifth region AR5 of the transition-target screen SC includes family names each having a first syllable represented by "KO".

The column titled "Movement distance L1" in FIG. 10 indicates ranges of the movement distance L1. The column titled "Display method" in FIG. 10 indicates a method by which the display section 521 displays a region AR corresponding to the movement distance L1. The second determination section 524 determines whether or not the movement distance L1 satisfies expression (1) below. When the second determination section 524 determines that the movement distance L1 satisfies expression (1), the display section 521 displays the first region AR1.

$$0 \leq L1 < LA \quad (1)$$

A first distance LA in above expression (1) is greater than 0.

The second determination section 524 determines whether or not the movement distance L1 satisfies expression (2) below. When the second determination section 524 determines that the movement distance L1 satisfies expression (2), the display section 521 displays the second region AR2.

$$LA \leq L1 < LB \quad (2)$$

A second distance LB in above expression (2) is greater than the first distance LA.

The second determination section 524 determines whether or not the movement distance L1 satisfies expression (3) below. When the second determination section 524 determines that the movement distance L1 satisfies expression (3), the display section 521 displays the third region AR3.

$$LB \leq L1 < LC \quad (3)$$

A third distance LC in above expression (3) is greater than the second distance LB.

The second determination section 524 determines whether or not the movement distance L1 satisfies expression (4) below. When the second determination section 524 determines that the movement distance L1 satisfies expression (4), the display section 521 displays the fourth region AR4.

$$LC \leq L1 < LD \quad (4)$$

A fourth distance LD in above expression (4) is greater than the third distance LC.

The second determination section 524 determines whether or not the movement distance L1 satisfies expression (5) below. When the second determination section 524 determines that the movement distance L1 satisfies expression (5), the display section 521 displays the fifth region AR5.

$$LD \leq L1 < LE \quad (5)$$

A fifth distance LE in above expression (5) is greater than the fourth distance LD.

The second determination section 524 determines whether or not the movement distance L1 satisfies expression (6) below. When the second determination section 524 determines that the movement distance L1 satisfies expression (6), the display section 521 causes inertial scrolling display of the fifth region AR5.

$$LE \leq L1 \quad (6)$$

The fifth distance LE is an example of the predetermined distance LP.

Note that the first through fourth distances LA to LD satisfy expression (7) below.

$$LD - LC = LC - LB = LB - LA = LA \quad (7)$$

That is, the second distance LB is twice the first distance LA. The third distance LC is three times the first distance LA. The fourth distance LD is four times the first distance LA.

Figure 11:
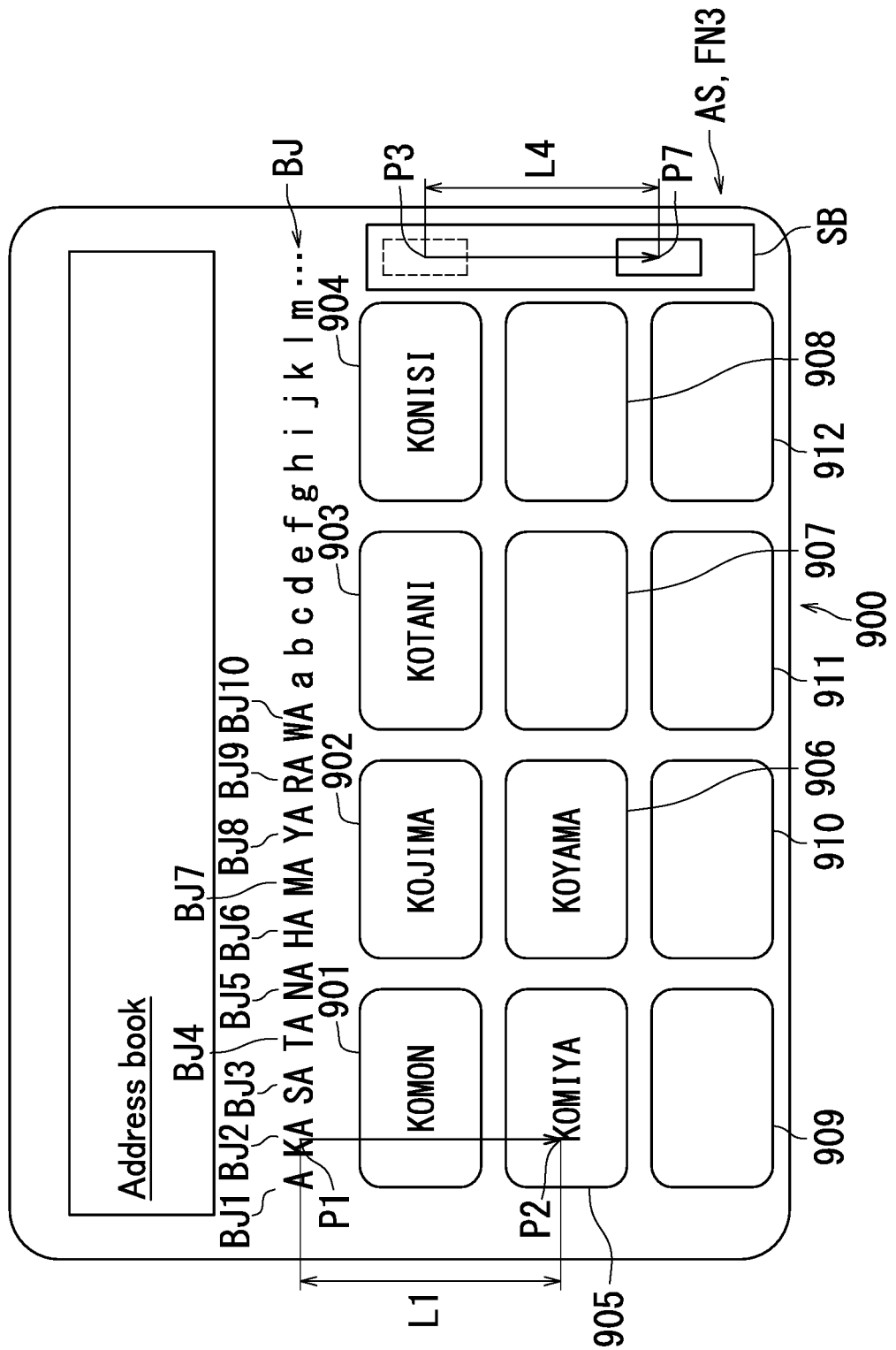
FIG. 11 is a screen diagram illustrating an example of an address selection screen displayed after a slide operation.

The following further describes the processing performed by the controller 5 according to the second embodiment with reference to FIGS. 3 and 8 to 11. FIG. 11 is a screen diagram illustrating an example of an address selection screen 900 displayed after a slide operation TS. As illustrated in FIG. 11, objects BJ and an option display area AS are displayed on the address selection screen 900.

The objects BJ include the first through tenth objects BJ1 to BJ10.

In the option display area AS, 12 family names included in the display range FN3 are displayed. Specifically, 12 buttons (buttons 901, 902, 903, 904, 905, 906, 907, 908, 909, 910, 911, and 912) corresponding to the 12 family names are displayed. The 12 family names are each displayed on a corresponding one of the buttons 901 to 912.

For example, "KOMON" is displayed on the button 901, "KOJIMA" is displayed on the button 902, "KOTANI" is displayed on the button 903, and "KONISI" is displayed on the button 904. That is, family names included in the first group listed where "Column" is "KA" and "First syllable" is "KO" (see FIG. 3) are displayed on the buttons 901 to 904.

A scroll bar SB is also displayed in the option display area AS. The scroll bar SB includes a slider SL. A center of the slider SL is located at a point P7. The point P7 is located at a distance L4 from a point P3 in the direction D1. The point P3 indicates an upper limit of a range across which the slider SL is movable within the scroll bar SB. The distance L4 is equal to the fourth distance LD.

The following describes processing performed by the controller 5 of the second embodiment to display the address selection screen 900 illustrated in FIG. 11 on the touch panel 41 when a slide operation TS is performed on the address selection screen 600 illustrated in FIG. 9.

The detection section 514 detects the movement distance L1. The second determination section 524 determines which expression among expressions (1) to (6) the movement distance L1 satisfies. Suppose for example that the movement distance L1 satisfies expression (5). Accordingly, the display section 521 displays the fifth region AR5. Specifically, the display section 521 determines 12 family names included in the first through third groups of the fifth region AR5 as the display range FN3 (see FIG. 3) to be displayed on a transition-target screen SC (address selection screen 900) and displays the display range FN3 on the touch panel 41.

As described above with reference to FIGS. 3 and 8 to 11, in the second embodiment of the present disclosure, the second determination section 524 determines which expression among expressions (1) to (6) the movement distance L1 satisfies. Based on a result of determination by the second determination section 524, the display section 521 determines any one of the first through fifth regions AR1 to AR5 as the display range FN. Therefore, the user can easily cause a desired region among the first through fifth regions AR1 to AR5 to be displayed in the option display area AS. The above results in further improvement in operability of the touch panel 41.

Further, the second distance LB is twice the first distance LA. The third distance LC is three times the first distance LA. The fourth distance LD is four times the first distance LA. Therefore, the user can more easily cause a desired region among the first through fifth regions AR1 to AR5 to be displayed in the option display area AS.

Although the transition-target screen SC is sectioned into the five regions AR (first through fifth regions AR1 to AR5) in the second embodiment of the present disclosure, this configuration should not be taken to limit the present disclosure. It is only required that the transition-target screen SC is sectioned into a plurality of regions AR. In a configuration in which the number of the regions AR is large, it is possible to display a family name that the user desires more efficiently. In a configuration in which the number of the regions AR is small, a user operation becomes easier.

Figure 12:
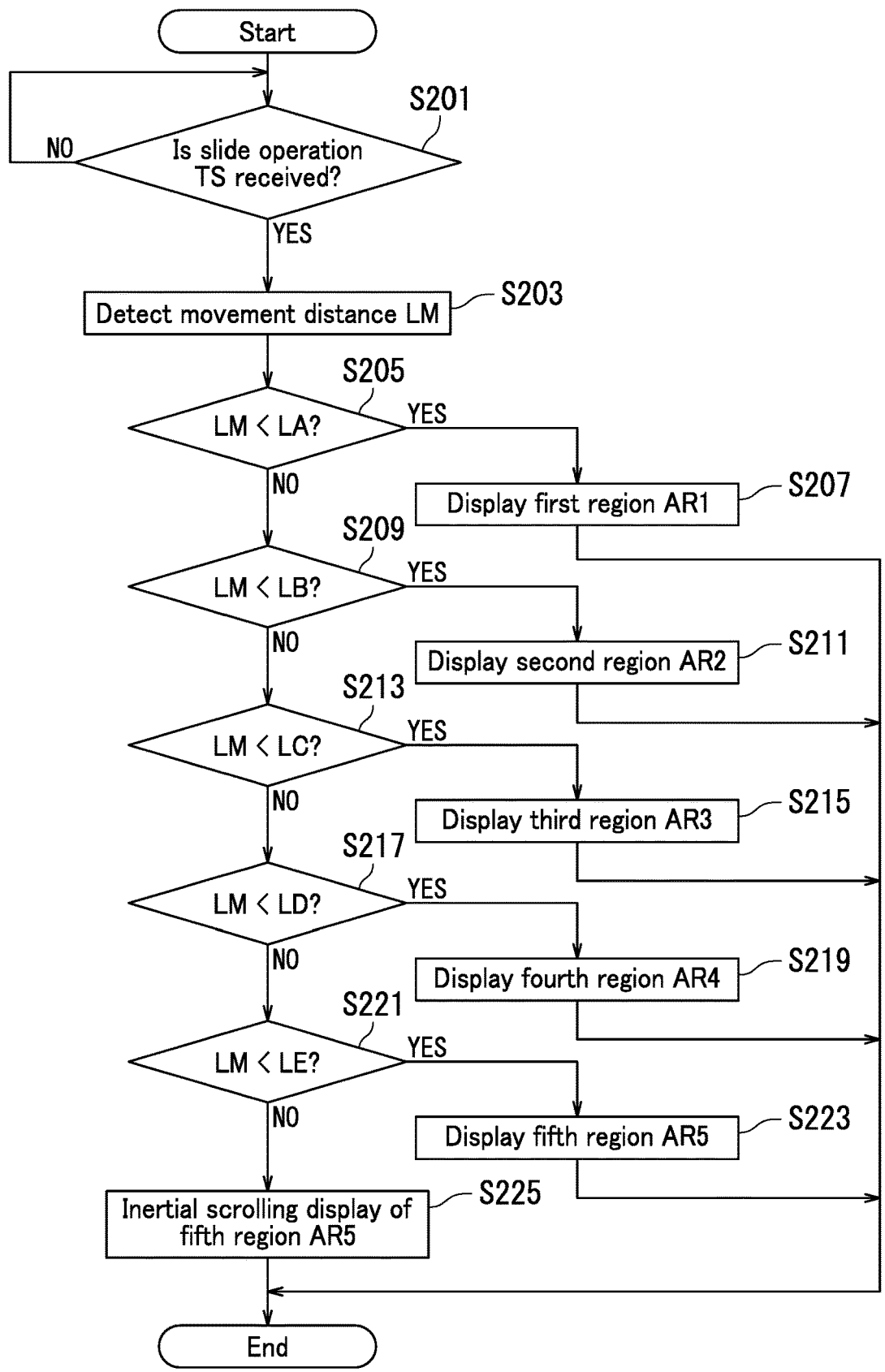
FIG. 12 is a flowchart depicting an example of processing performed by the controller according to the second embodiment.

The following describes processing performed by the controller 5 according to the second embodiment with reference to FIGS. 3 and 8 to 12. FIG. 12 is a flowchart depicting an example of the processing performed by the controller 5 according to the second embodiment. Note that the controller 5 performs the following processing in a situation in which an object BJ is displayed on the touch panel 41 by the display section 511.

First, the receiving section 522 determines at Step S201 in FIG. 12 whether or not a slide operation TS on the object BJ is received.

When the receiving section 522 determines that no slide operation TS is received (NO at Step S201), the processing is suspended. When the receiving section 522 determines that the slide operation TS is received (YES at Step S201), the routine proceeds to Step S203.

At Step S203, the detection section 514 detects a movement distance LM of the slide operation TS.

At Step S205, the second determination section 524 determines whether or not the movement distance LM is less than the first distance LA.

When the second determination section 524 determines that the movement distance LM is less than the first distance LA (YES at Step S205), the routine proceeds to Step S207.

At Step S207, the display section 521 displays the first through third groups of the first region AR1 and the processing ends then.

When the second determination section 524 determines that the movement distance LM is not less than the first distance LA (NO at Step S205), the routine proceeds to Step S209.

At Step S209, the second determination section 524 determines whether or not the movement distance LM is less than the second distance LB.

When the second determination section 524 determines that the movement distance LM is less than the second distance LB (YES at Step S209), the routine proceeds to Step S211.

At Step S211, the display section 521 displays the first through third groups of the second region AR2 and the processing ends then.

When the second determination section 524 determines that the movement distance LM is not less than the second distance LB (NO at Step S209), the routine proceeds to Step S213.

At Step S213, the second determination section 524 determines whether or not the movement distance LM is less than the third distance LC.

When the second determination section 524 determines that the movement distance LM is less than the third distance LC (YES at Step S213), the routine proceeds to Step S215.

At Step S215, the display section 521 displays the first through third groups of the third region AR3 and the processing ends then.

When the second determination section 524 determines that the movement distance LM is not less than the third distance LC (NO at Step S213), the routine proceeds to Step S217.

At Step S217, the second determination section 524 determines whether or not the movement distance LM is less than the fourth distance LD.

When the second determination section 524 determines that the movement distance LM is less than the fourth distance LD (YES at Step S217), the routine proceeds to Step S219.

At Step S219, the display section 521 displays the first through third groups of the fourth region AR4 and the processing ends then.

When the second determination section 524 determines that the movement distance LM is not less than the fourth distance LD (NO at Step S217), the routine proceeds to Step S221.

At Step S221, the second determination section 524 determines whether or not the movement distance LM is less than the fifth distance LE.

When the second determination section 524 determines that the movement distance LM is less than the fifth distance LE (YES at Step S221), the routine proceeds to Step S223.

At Step S223, the display section 521 displays the first through third groups of the fifth region AR5 and the processing ends then.

When the second determination section 524 determines that the movement distance LM is not less than the fifth distance LE (NO at Step S221), the routine proceeds to Step S225.

At Step S225, the display section 521 causes inertial scrolling display of the fifth region AR5 and the processing ends then.

Note that Step S201 corresponds to an example of "receiving". Steps S205 to S225 correspond to an example of "determining".

As described above with reference to FIGS. 3 and 8 to 12, in the second embodiment of the present disclosure, any one of the five regions (first through fifth regions AR1 to AR5) of the transition-target screen SC is determined as the display range FN based on the movement distance LM and the determined region is displayed. Therefore, the user can easily select a region that the user intends to display. The above results in further improvement in operability of the touch panel 41.

Through the above, the embodiments of the present disclosure have been described with reference to the drawings. However, the present disclosure is not limited to the above embodiments and can be practiced in various manners within a scope not departing from the gist of the present disclosure (for example as described below in (1) to (4)). The drawings schematically illustrate elements of configuration in order to facilitate understanding. Properties of the elements of configuration such as thickness and length and the number thereof illustrated in the drawings may differ from actual ones in order to facilitate preparation of the drawings. Shape, dimensions, and the like of elements of configuration described in the above embodiments are merely examples and should not be taken to limit the present disclosure. Various alterations may be made within a scope not substantially departing from the configuration of the present disclosure.

(1) As described with reference to FIGS. 1, 2, and 8, the "display control device" is a part of the image forming apparatus 100 in the first and second embodiments of the present disclosure, which however should not be taken to limit the present disclosure. It is only required that the "display control device" includes at least the touch panel 41 and the controller 5. The "display control device" may be for example a tablet terminal device.

(2) As described with reference to FIGS. 1 to 4, 8, and 9, the objects BJ include the first through tenth objects BJ1 to BJ10 in the first and second embodiments of the present disclosure, which however should not be taken to limit the present disclosure. It is only required that at least one object BJ is displayed.

(3) As described with reference to FIGS. 1 to 4, 8, and 9, the scroll bar SB is displayed on a screen (address selection screen 600) that receives a slide operation TS in the first and second embodiments of the present disclosure, which however should not be taken to limit the present disclosure. It is only required that a transition-target screen SC includes the scroll bar SB.

(4) As described with reference to FIGS. 1 to 4, 8, and 9, the movement direction of the slide operation TS is parallel to the direction D1 in the first and second embodiments of the present disclosure, which however should not be taken to limit the present disclosure. It is only required that the movement direction of the slide operation TS includes a component in a movement direction of the slider SL of the scroll bar SB. For example, in a situation in which the slide operation TS is performed in a direction inclined from the direction D1, a movement distance of a component of the slide operation TS in a direction parallel to the direction D1 may be detected as the movement distance LM of the slide operation TS.

What is claimed is:

1. A display control device comprising:
    a touch panel;
    a display section configured to display objects and at least a family name belonging to a group on the touch panel,
        the group being included in groups of family names, each of the family names being composed of a combination selected from vowels and consonants, the family names being classified into the groups of family names for each of respective first vowels of the family names,
        the groups of family names including vowel-classified groups and vowel-and-consonant-classified groups, of the family names: family names whose respective first syllables are vowel-based first syllables each of which consists of only any one of the vowels being classified into the vowel-classified groups for each of the vowel-based first syllables; and family names whose respective first syllables are vowel-and-consonant-based first syllables each of which comprises a consonant of the consonants along with a vowel of the vowels being classified into the vowel-and-consonant-classified groups for each of the vowel-and-consonant-based first syllables, and
    the objects representing respective first syllables, each of which includes a vowel of the vowels, of the vowel-based first syllables and the vowel-and-consonant-based first syllables;
    a first determination section configured to determine whether or not an operation duration of a slide operation is lasting;
    a receiving section configured to receive the slide operation on the object; and
    a detection section configured to detect a movement distance from a start point of the slide operation, wherein
    when the first determination section determines that the operation duration of the slide operation is lasting, and the slide operation is received by the receiving section, the display section determines, based on the movement distance from the start point of the slide operation, a display range to be displayed on a transition-target screen corresponding to the object and displays the family name belonging to the group according to the display range on the touch panel.

2. The display control device according to claim 1, wherein
    the transition-target screen includes a scroll bar including a slider, and
    the display range corresponds to a display range to be displayed in a situation in which the slide operation is performed on the slider of the scroll bar.

3. The display control device according to claim 1, wherein
    the transition-target screen is sectioned into a plurality of regions, and
    the display section determines as the display range one of the plurality of regions based on the movement distance.

4. The display control device according to claim 3, further comprising
    a second determination section configured to determine whether or not the movement distance is at least a predetermined distance when the slide operation is ended, wherein
    when the second determination section determines that the movement distance is at least the predetermined distance, the display section causes inertial scrolling display of the transition-target screen by displaying the transition-target screen while scrolling as if inertia is acting thereon even after the slide operation is ended.

5. The display control device according to claim 3, wherein
    the transition-target screen includes a scroll bar including a slider,
    the movement distance indicates a movement distance in a specific direction, and
    the specific direction indicates a direction of movement of the slider of the scroll bar.

6. A display control method executed by a display control device including a touch panel, the display control method comprising:
- displaying by the display control device objects and at least a family name belonging to a group on the touch panel,
  - the group being included in groups of family names, each of the family names being composed of a combination selected from vowels and consonants, the family names being classified into the groups of family names for each of respective first vowels of the family names,
  - the groups of family names including vowel-classified groups and vowel-and-consonant-classified groups,
  - of the family names: family names whose respective first syllables are vowel-based first syllables each of which consists of only any one of the vowels being classified into the vowel-classified groups for each of the vowel-based first syllables; and family names whose respective first syllables are vowel-and-consonant-based first syllables each of which comprises a consonant of the consonants along with a vowel of the vowels being classified into the vowel-and-consonant-classified groups for each of the vowel-and-consonant-based first syllables, and
  - the objects representing respective first syllables, each of which includes a vowel of the vowels, of the vowel-based first syllables and the vowel-and-consonant-based first syllables;
- determining by a first determination section whether or not an operation duration of a slide operation is lasting;
- receiving by a receiving section the slide operation on the object;
- detecting by a detection section a movement distance from a start point of the slide operation; and
- upon determination of the operation duration of the slide operation being lasting, and reception of the slide operation, determining by the display control device based on the movement distance from the start point of the slide operation a display range to be displayed on a transition-target screen corresponding to the object and displaying the family name belonging to the group according to the display range on the touch panel.

* * * * *